United States Patent
Westerberg

(10) Patent No.: US 7,143,633 B2
(45) Date of Patent: Dec. 5, 2006

(54) PORTABLE TESTING APPARATUS FOR ELECTRICAL INSULATING GLOVES

(76) Inventor: William D. Westerberg, 2166 S. Skyline Dr., Burnsville, MN (US) 55337

( * ) Notice: Subject to any disclaimer, the term of this patent is extended or adjusted under 35 U.S.C. 154(b) by 176 days.

(21) Appl. No.: 11/021,400

(22) Filed: Dec. 27, 2004

(65) Prior Publication Data

US 2006/0144127 A1   Jul. 6, 2006

(51) Int. Cl.
*G01M 3/04* (2006.01)
(52) U.S. Cl. .......................... 73/40; 223/111
(58) Field of Classification Search ............ 73/37, 73/40, 41; 223/111
See application file for complete search history.

(56) References Cited

U.S. PATENT DOCUMENTS

| 2,370,945 A | * | 3/1945 | Fields ............... 73/37 |
| 3,820,383 A | * | 6/1974 | Van Deventer et al. ......... 73/41 |
| 3,991,604 A | * | 11/1976 | Hayes et al. ............ 73/37 |
| 4,010,877 A | * | 3/1977 | Hayes et al. ............ 223/37 |
| 4,206,631 A | * | 6/1980 | Nysse et al. ............ 73/40 |
| 5,078,308 A | * | 1/1992 | Sullivan ............ 223/111 |
| 5,493,899 A | * | 2/1996 | Beck et al. ............ 73/40.7 |
| 6,832,708 B1 | * | 12/2004 | Sinai ............ 223/111 |
| 2003/0094468 A1 | * | 5/2003 | Sinai ............ 223/111 |
| 2006/0130559 A1 | * | 6/2006 | Doehla et al. ............ 73/37 |

OTHER PUBLICATIONS

The G-I Glove Inflator brochure, 2001, Minneapolis, MN., United States www.gloveinflator.com.

* cited by examiner

*Primary Examiner*—Edward Lefkowitz
*Assistant Examiner*—Andre Allen
(74) *Attorney, Agent, or Firm*—Gary L. Huusko

(57) ABSTRACT

A testing apparatus to test electrical insulating gloves is disclosed. The apparatus is a cylindrically shaped, grooved housing unit with an air outlet and an air valve that attaches to a glove inflator, such as the G-I Glove Inflator, to allow testing of various sizes of electrical insulating gloves of varying voltage ratings. The electrical insulating glove is stretched over a groove and held in place by a stretchable o-ring, thereby allowing the glove inflator to inflate the glove to a sufficient size to enable to electrical worker to inspect the glove for damage and leakage, which, if present, would decrease or eliminate the effectiveness of the glove's insulating characteristics.

5 Claims, 4 Drawing Sheets

PORTABLE TESTING APPARATUS FOR ELECTRICAL INSULATING GLOVES

BACKGROUND OF THE INVENTION

This invention relates to a portable apparatus for testing the insulating fitness of electrical insulating gloves and similar objects. Electrical insulating gloves are typically made of rubber or some other non-conductive material. It is desired by electrical workers to test their insulating gloves frequently for holes or other defects to determine that the insulating gloves maintain their insulating character, thus providing safety to the electrical worker. There are several testing products intended to be used in the service shop, some pedestal styles and others bench top styles. There was a need for a portable testing apparatus, to allow for testing in the field, which resulted in the inventor's creation of the G-I Glove Inflator, currently manufactured and sold by Protection Products Company. The G-I Glove Inflator or similar glove inflating devices, while portable, were intended to be used by electrical linemen to test their heavy duty insulating gloves, and for that purpose, served them well. Smaller sized insulating gloves, with varying voltage ratings, however, were unable to be tested easily on the existing inflating devices. Thus, the need for a portable testing device that would enable electrical workers to test any size glove, and that would work with their existing glove inflators existed. The present invention addresses those needs, thereby providing increased safety for electrical workers at an economical cost.

SUMMARY OF THE INVENTION

An apparatus to test leakage of air within an electrical insulating glove is provided comprising a cylindrically shaped grooved housing that is attachable at one end to a glove inflator, such as the G-I Glove Inflator or similar device, and at the other end comprising an air outlet and valve, whereby an electrical insulating glove can be stretched over a groove and held in place by a stretchable o-ring, thereby allowing the glove inflator to inflate the glove to a sufficient size to enable an electrical worker to inspect the glove for leakage, which, if present, would decrease or eliminate the effectiveness of the glove's insulating characteristic.

DETAILED DESCRIPTION OF THE INVENTION AND PREFERRED EMBODIMENTS WITH REFERENCE TO THE DRAWINGS

Figure 1:
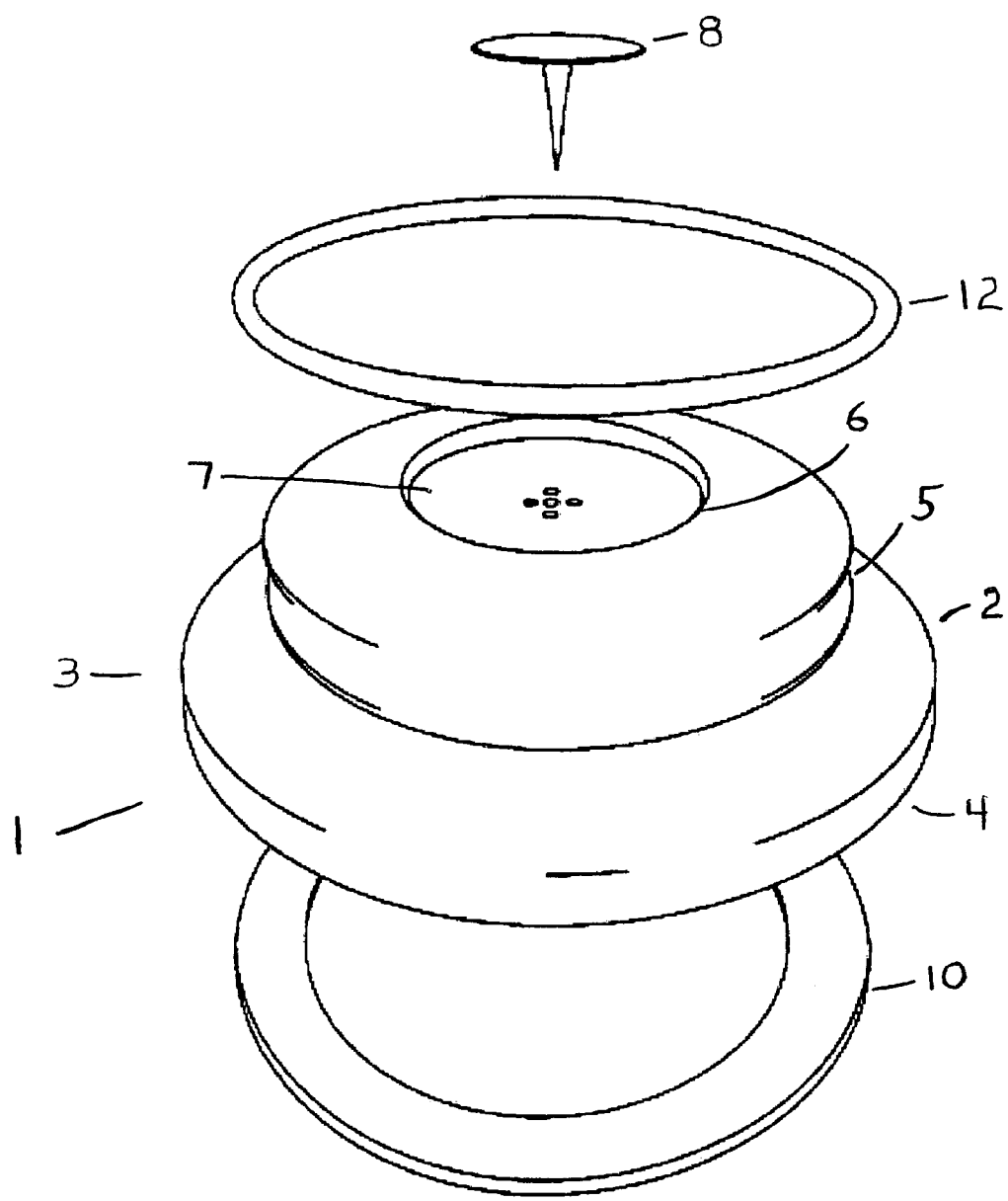
FIG. 1 is an exploded view of the glove testing apparatus.

Referring first to FIG. 1, a testing apparatus 1 for detecting defects in electrical insulating gloves is shown. The apparatus comprises a cylindrical body 2 having a grooved housing 3 and an inflator attachment end 4. The testing apparatus 1 can be made of metal or durable plastic.

Figure 3:
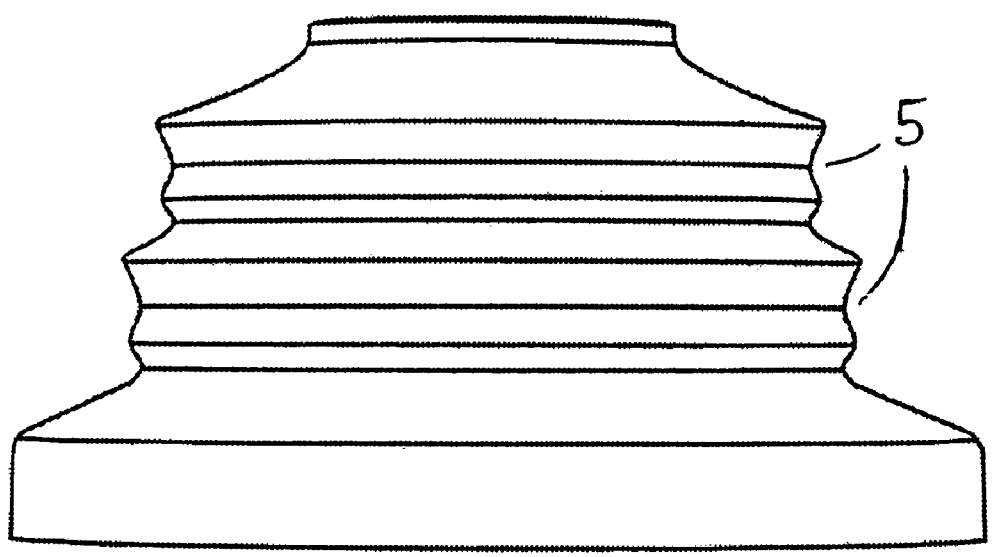
FIG. 3 is a side view of the apparatus showing multiple grooves.

Referring to FIG. 3, the grooved housing 3 further comprises one or more concentric grooves 5.

Referring back to FIG. 1, the grooved housing 3 further comprises an air outlet end 6, and an air outlet 7 that is located at the air outlet end 6. An air valve 8 is removably attached to the air outlet 7, whereby the air valve 8 allows air to flow out of the testing apparatus 1 through the air outlet 7, thereby restricting the flow of air back into the testing apparatus 1 through the air outlet 7. The preferred embodiment shows the air outlet 7 comprising a plurality of holes drilled through the grooved housing 3 at the air outlet end 6. The preferred embodiment also shows the air valve 8 being made of rubber or some other such flexible material, whereby the air valve 8 is attached to the center of the air outlet 7, whereby the air is allowed to flow through the holes in the air outlet 7 in one direction only.

Figure 2:
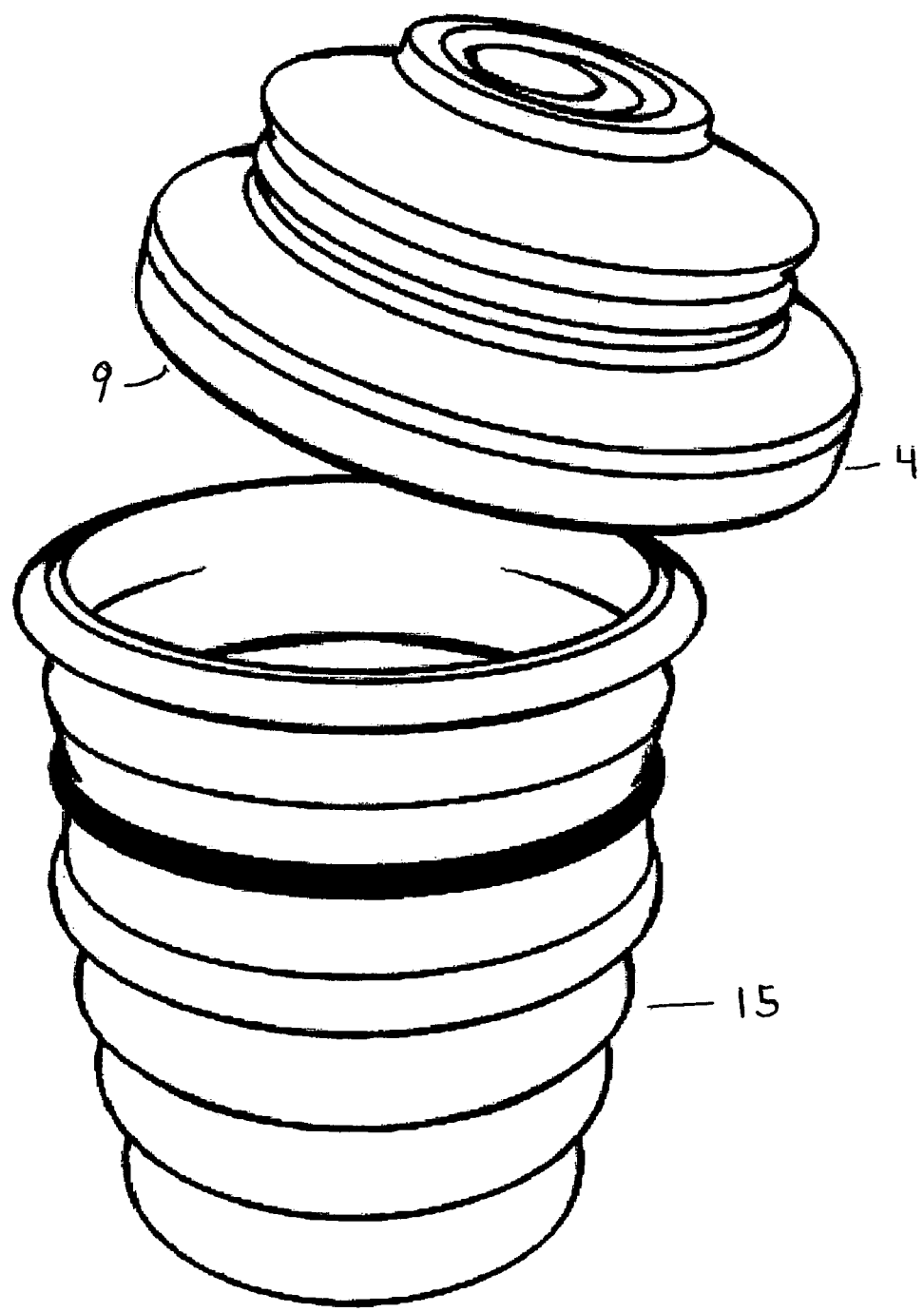
FIG. 2 is a perspective view of the apparatus in use with a glove inflator.

Referring now to FIG. 2, the inflator attachment end 4 comprises a circular opening 9 of sufficient diameter to fit snugly around a G-I Glove Inflator 15 or similar glove inflating device. A gasket 10, as shown in FIG. 1, is used to form an airtight seal between the inflator attachment end 4 and the G-I Glove Inflator or similar glove inflating device. The preferred embodiment would show an attaching means, such as a fabric strip, that can attach the inflator attachment end 4 to the G-I Glove Inflator or similar glove inflating device. The testing apparatus 1 can also be permanently attached at the inflator attachment end 4 to a glove inflator by the use of glue, welding or some other adhesive or attaching material or process. In addition, the testing apparatus 1 and the G-I Glove Inflator can be manufactured as a single unit, utilizing machining, extrusion or other metal manufacturing processes.

Referring again to FIG. 1, a glove attaching means 12 is shown and is removably located around the grooved housing 3, to be placed around the electrical insulating glove and seated within one of the grooves 5 when a glove is stretched over the grooves 5. The gasket 10 forms an airtight seal between the G-I Glove Inflator or similar glove inflating device and the testing apparatus 1. In the preferred embodiment, the glove attaching means 12 is a stretchable o-ring 12. The function served by the stretchable o-ring 12 can just as easily be served by a similar attaching means, such as a fabric strip or rubber band or the like, Referring now to FIG. 3, the grooved housing 3 is shown. The preferred embodiment comprises a plurality of concentric grooves 5. The grooves 5 are of varying diameters. The diameter of each groove 5 is smaller than the next nearest groove 5 nearest the inflator attachment end 4. Thus, each successive groove 5 is smaller than the previous, beginning from the inflator attachment end 4 of the apparatus. The plurality of grooves 5 allows the apparatus to be used for a variety of sizes of gloves.

Figures 4, 5:
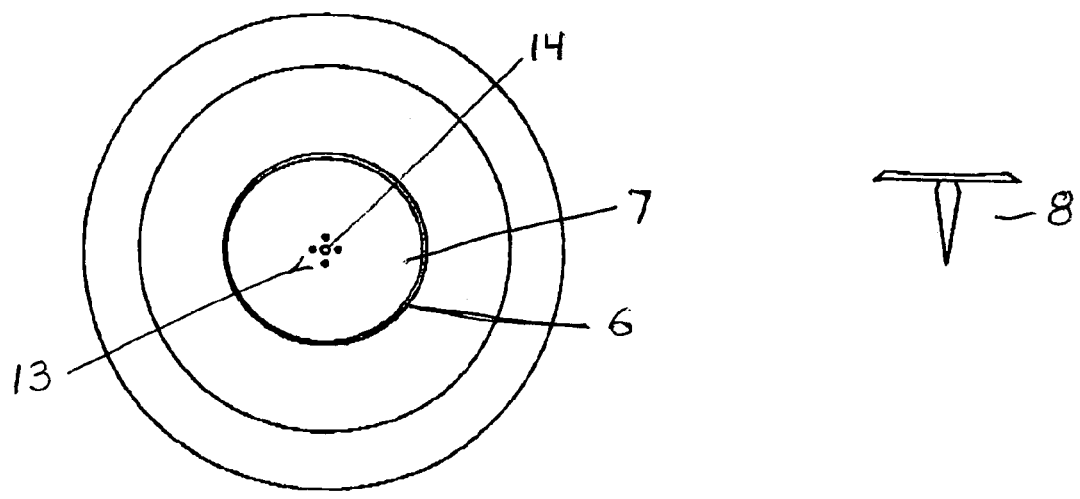
FIG. 4 is a top view of the apparatus showing the air outlet.
FIG. 5 is a side view of the air valve shown in FIG. 1.

Referring now to FIG. 4, the air outlet end 6 is shown, within which the air outlet 7 is disposed. The air outlet 7 comprises several holes 13 to allow air to flow through the air outlet 7. A center hole 14 is shown, in which the air valve 8 is inserted and attached.

FIG. 5 shows the air valve.

In use, an electrical insulating glove opening is stretched around the grooved housing 3 and held in place on one of the concentric grooves 5 by the stretchable o-ring 12, the stretchable o-ring 12 being stretched and placed around the electrical insulating glove and released to fit snugly within a concentric groove 5, holding the insulating glove tightly to the grooved housing 3 and forming an airtight seal, whereby air is forced into the electric insulating glove by the G-I Glove Inflator or similar glove inflating device and held in the glove by the air valve 8, thereby inflating the glove, whereby a visual and manual inspection of the glove for physical damage including air leaks can be performed.

I claim:

1. A testing apparatus for detecting defects in electrical insulating gloves, comprising:
   a cylindrical body having a grooved housing and an inflator attachment end, the grooved housing comprising a concentric groove, an air outlet end, an air outlet located at the air outlet end and comprising a plurality of air holes and a center air valve hole, and an air valve removably attached to the air valve hole of the air outlet, whereby the air valve allows air to flow out of the testing apparatus through the air outlet and restricts the flow of air back into the testing apparatus through the air outlet;
   the inflator attachment end comprising a circular opening of sufficient diameter to fit snugly around a G-I Glove Inflator or similar glove inflating device, a gasket to form an airtight seal between the inflator attachment end and the G-I Glove Inflator or similar glove inflating device and an attaching means to attach the inflator attachment end to the G-I Glove Inflator or similar glove inflating device; and
   a glove attaching means removably located around the grooved housing, whereby the testing apparatus is attached to the G-I Glove Inflator or similar glove inflating device by means of the attaching means, the gasket forming an airtight seal between the G-I Glove Inflator or similar glove inflating device and the testing apparatus and an electrical insulating glove opening is stretched around the grooved housing and held in place on the grooved housing by the glove attaching means, said glove attaching means being placed around the electrical insulating glove and seated within the concentric groove, holding the glove tightly to the testing apparatus, whereby air is forced into the electric insulting glove by the G-I Glove Inflator or similar glove inflating device and held in the glove by the air valve, thereby inflating the glove, whereby a visual and manual inspection of the glove for air leaks can be performed.

2. The testing apparatus as described in claim 1 in which there are a plurality of concentric grooves, each such groove being of decreasing diameter from the inflator attachment end to the first bore, whereby electric insulating gloves of varying sizes can be tested.

3. The testing apparatus as described in claim 1 in which the testing apparatus is constructed out of any suitably durable material, such as metal or plastic.

4. The testing apparatus as described in claim 1 in which the inflator attachment end is fixedly and permanently attached to the G-I Glove Inflator or similar glove inflating device or similar device.

5. The testing apparatus as described in claim 1 in which the glove attaching means is a stretchable o-ring.

* * * * *